Aug. 20, 1940.   E. MOWRY   2,211,906
TILLING IMPLEMENT
Filed Oct. 19, 1939
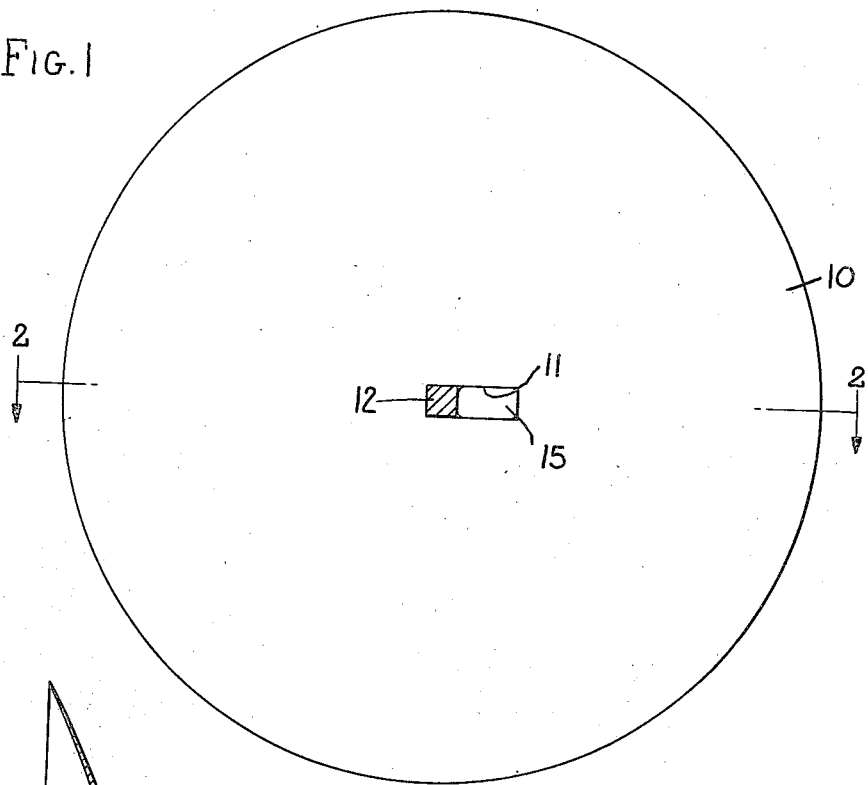
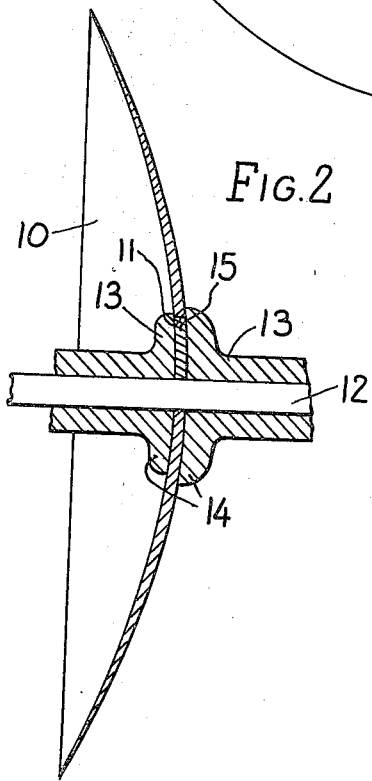
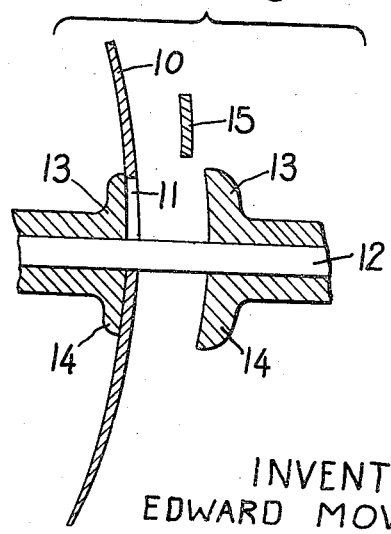
INVENTOR
EDWARD MOWRY
BY Paul O. Pippel
ATT'Y.

Patented Aug. 20, 1940

2,211,906

UNITED STATES PATENT OFFICE 2,211,906

TILLING IMPLEMENT

Edward Mowry, Sterling, Ill., assignor to International Harvester Company, a corporation of New Jersey Application October 19, 1939, Serial No. 300,097

9 Claims. (Cl. 97—217)

This invention relates to a tilling implement and more particularly to an implement of the pit plowing or basin forming type.

A common construction of the type in which improvements are contemplated by the present invention is disclosed in United States patent to Benjamin, No. 2,136,607, granted November 15, 1938, on an application filed December 24, 1936. As clearly disclosed in that patent, the invention therein provides a tilling implement comprising a plurality of tilling elements adapted for basin forming or pit plowing operations, each element comprising generally a disk having a pair of square openings therein for mounting the element on the square shaft of the implement in either of two positions. One opening is at the true center of the disk while the other opening is radially spaced therefrom so that when the element is mounted on the shaft at a second opening therein, the element is eccentrically disposed with respect to the shaft, thus providing opposite cutting portions, one of which cuts the soil in furrows of considerable depth while the other cuts the soil in rather shallow furrows. A number of disks arranged in this manner along the shaft function in a desirable manner for treating the soil for the purposes intended.

A further improvement in an implement of the type referred to forms the subject of assignee's copending application, Serial No. 215,767, filed January 19, 1939. The invention therein disclosed provides a slot at the center of the disk, commensurate with the position of the two openings aforesaid. This provision enables the disk or element to be slidably positioned radially of the shaft while the disk remains on the shaft. In utilizing this improved form of implement it has been found that the elements or disks have a tendency to slip out of position.

The present invention contemplates and has for its principal object the provision of a locking means for preventing relative movement between the element or disk and the shaft.

An important object is to provide the locking means in the form of an insert member adapted to fill that portion of the slot or opening in the disk not occupied by the shaft.

Another object is to provide this insert in the form of a member having a thickness generally equal to the thickness of the disk or element so that the insert is generally enclosed within the opening.

Another object is to provide for retaining the element in position by the cooperative effect of mounting spools arranged on the shaft with the disk or element therebetween.

Briefly, and specifically, these and other important objects are achieved in one preferred form of the invention by the provision of a disk or tilling element having a generally rectangular opening or slot formed therein substantially at its center. The disk is adapted to be mounted on a shaft generally square in cross-section, the cross-sectional area of the shaft being considerably less than the extent of the slot. An insert member is arranged within the slot, filling that portion of the slot not occupied by the square shaft.

A more complete understanding of the invention may be had from the following detailed description taken in conjunction with the accompanying sheet of drawings wherein:

Figure 1 is a face view of a disk or element showing the insert or locking mechanism in position;

Figure 2 is a horizontal sectional view taken on the line 2—2 of Figure 1; and

Figure 3 is a view similar to that in Figure 2, showing the parts in a state of partial disassembly.

In the preferred form of the invention, the tilling element is generally a circular disk 10 formed substantially at its center with an elongated rectangular slot or opening 11 lying generally on a diameter of the disk. This opening is adapted to receive a square mounting shaft 12 for mounting the disk on the shaft. The shaft 12 is the mounting shaft of an implement of the type usually referred to as a disk plow.

As well understood by those skilled in the art, the mounting shaft carries a plurality of mounting sleeves or spools, a pair of which is generally indicated at 13 in Figures 2 and 3. Each spool has a radial flange 14 of sufficient diameter to overlie the slot or opening 11. In a prior arrangement of the particular device described, clamping of the spools with the disk therebetween was relied upon to retain the position of the disk. This clamping was effected in the usual manner by tightening the nut at the end of the mounting shaft. The outer end of the mounting shaft has been omitted from the present disclosure since it is believed the illustration of a single disk and the manner of mounting the same is sufficient for the purpose of disclosing the present invention.

It has been found that, in this prior construction referred to, operation of the implement resulted in a slight loosening of the clamping action of the spools 13, thus permitting the disks to slide out of position. The present invention eliminates this difficulty by the provision of a locking means in the form of an insert member 15, this member being inserted in the slot 11 in that portion thereof not occupied by the square shaft 12. The slot 11 is, of course, rectangular while the shaft 12 is square, the effect of the arrangement being that the shaft and the insert combine to fill the slot 11 so that relative movement between the disk and the shaft is prevented.

The insert member 15 is preferably formed of a thickness generally equal to the thickness of that portion of the disk or element immediately surrounding the slot or opening 11. This provision enables the insert member to be retained between the spools 13, being thus overlapped by the radial flanges 14 on the spools. This arrangement is best shown in Figure 2.

Figure 3 illustrates the arrangement of the parts in a state of partial disassembly. It will appear from this illustration that the spools 13 may be readily separated and the insert 15 removed from the slot 11. The disk 10 may be adjusted or moved radially of the shaft 12, whereat the insert is replaced at the other side of the shaft so that the disk now assumes a second position with respect to the shaft. The spools are replaced and the assembly adjusted and tightened for operation.

It will be understood, of course, that the foregoing description applies to a preferred embodiment of the invention and that the insert member or various forms thereof may be utilized with other types of elements for the same purposes and for obtaining similar results. It will be further appreciated that numerous other alterations may be made without departing from the spirit and scope of the invention as described in the appended claims.

What is claimed is:

1. In an earth working implement including a mounting shaft and a tilling element having an opening therein for mounting the element on the shaft, the opening being larger than the cross-sectional area of the shaft to provide for adjustment of the element radially of the shaft, the combination therewith of insert means for substantially filling that portion of the opening not occupied by the shaft.

2. In an earth working implement including a mounting shaft and a tilling element having an opening therein for mounting the element on the shaft, the opening being larger than the cross-sectional area of the shaft to provide for adjustment of the element radially of the shaft, the combination therewith of locking means engaged between the shaft and the element at a portion of the opening therein not occupied by the shaft.

3. In an earth working implement including a mounting shaft generally square in cross-section and a tilling element having a generally rectangular slot therein for receiving the shaft to mount the element, the combination therewith of locking means engaged between the shaft and the element at a portion of the slot not occupied by the shaft.

4. In an earth working implement including a mounting shaft generally square in cross-section and a tilling element having a generally rectangular slot therein for receiving the shaft to mount the element, the combination therewith of an insert member substantially filling the portion of the slot not occupied by the shaft.

5. In an earth working implement including a mounting shaft generally square in cross-section and a tilling element having a generally rectangular slot therein for receiving the shaft to mount the element, the combination therewith of an insert member filling the portion of the slot not occupied by the shaft, said member being of a thickness generally equal to the thickness of the portion of the element surrounding the opening.

6. In an agricultural implement including a square mounting shaft and a disk having a rectangular slot for receiving the shaft to mount the disk, and a pair of mounting spools arranged on the shaft with the disk therebetween, each spool having a radial flange generally overlying the slot, the combination therewith of an insert member filling that portion of the slot not occupied by the shaft, said member being retained by the spool flanges.

7. In a tilling implement comprising mounting means and a tilling element carried thereby, said means including a mounting shaft, and said element having an opening therein for receiving the shaft to mount the element, said opening being larger than the cross-sectional area to provide for adjustment of the element radially of the shaft, the combination therewith of a locking means for the element engaged between the mounting means and the element at a portion of the opening not occupied by the shaft.

8. In a tilling implement having a mounting shaft formed with opposite parallel sides and substantially rectangular in cross-section, and a tilling element having an arcuate cutting edge and formed with an elongated slot having opposite sides cooperating with the aforesaid sides of the shaft for mounting the element on the shaft for rotation therewith, said slot being of a sufficient length greater than the cross-section of the shaft to permit slidable positioning of the element with respect to the shaft, the combination therewith of means substantially filling that portion of the slot not occupied by the shaft for positioning the element on the shaft.

9. In a tilling implement having a mounting shaft formed with opposite parallel sides, and a tilling element having an arcuate cutting edge and formed with an elongated slot having opposite sides cooperating with the aforesaid sides of the shaft for mounting the element on the shaft for rotation therewith, said slot being of a sufficient length to permit slidable positioning of the element with respect to the shaft, the combination therewith of means for filling portions of the slot not occupied by the shaft for positioning the element on the shaft.

EDWARD MOWRY.